(12) United States Patent
Pound et al.

(10) Patent No.: US 9,795,114 B2
(45) Date of Patent: Oct. 24, 2017

(54) AUTOMATICALLY DETACHABLE COLLAR PENDANT SYSTEM

(71) Applicant: The United States of America, as represented by The Secretary of Agriculture, Washington, DC (US)

(72) Inventors: Joe M. Pound, Ingram, TX (US); Kimberly H. Lohmeyer, Kerrville, TX (US); Gary R. Earl, Kerrville, TX (US); Randy W. Ryan, Jr., Harper, TX (US); Joseph E. Johnson, Jr., Perry, ME (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 169 days.

(21) Appl. No.: 14/719,529

(22) Filed: May 22, 2015

(65) Prior Publication Data

US 2016/0338318 A1    Nov. 24, 2016

(51) Int. Cl.
| | | |
|---|---|---|
| A01K 13/00 | (2006.01) | |
| A01K 5/02 | (2006.01) | |
| A01K 27/00 | (2006.01) | |
| A01K 29/00 | (2006.01) | |
| A01K 11/00 | (2006.01) | |

(52) U.S. Cl.
CPC .............. *A01K 5/02* (2013.01); *A01K 11/006* (2013.01); *A01K 13/003* (2013.01); *A01K 27/001* (2013.01); *A01K 27/009* (2013.01); *A01K 29/00* (2013.01)

(58) Field of Classification Search
CPC ...... A01K 5/02; A01K 13/003; A01K 27/001; A01K 27/00; A01K 27/007; A01K 27/009; A01K 15/021; A01K 11/006
USPC .... 119/51.02, 174, 856, 650, 651, 652, 653, 119/654, 719, 720, 865
See application file for complete search history.

(56) References Cited

U.S. PATENT DOCUMENTS

| | | | | |
|---|---|---|---|---|
| 3,557,757 A * | 1/1971 | Brooks | ............... | A01K 11/006 119/51.02 |
| 4,426,955 A * | 1/1984 | Monroe | ............... | A01K 11/006 119/51.02 |
| 4,748,938 A * | 6/1988 | Owen | .................. | A01K 27/009 119/650 |
| 5,881,672 A * | 3/1999 | Pound | .................. | A01K 13/003 119/174 |
| 9,179,647 B2 * | 11/2015 | Lambert | ............... | A01K 27/001 |
| 9,549,536 B2 * | 1/2017 | Soto | ..................... | A01K 27/005 |
| 9,615,543 B2 * | 4/2017 | Pach | ..................... | A01K 27/001 |
| 2013/0333634 A1 * | 12/2013 | Rosenquist | .......... | A44B 11/263 119/865 |
| 2016/0338324 A1 * | 11/2016 | Pound | .................. | A01K 27/007 |

* cited by examiner

*Primary Examiner* — Trinh Nguyen
(74) *Attorney, Agent, or Firm* — John D. Fado; Robert D. Jones

(57) ABSTRACT

The automatically detachable collar pendant system is structured so that when the system receives a signal, one end of the collar is released from the rest of the collar body, thereby unfastening the collar and allowing the collar to fall off of a target animal. The "signal" may comprise a magnetic or induction heat signal. In the preferred embodiment, the signal is received (and the collar is unfastened) when the target animal feeds at a specially-equipped bait station.

10 Claims, 8 Drawing Sheets

AUTOMATICALLY DETACHABLE COLLAR PENDANT SYSTEM

FIELD OF THE INVENTION

The disclosed method and apparatus relates to a detachable collar system. Specifically, the apparatus and associated method described herein relates to a wildlife collar device that can be detached using specialized hardware that is incorporated into a wildlife baiting station.

BACKGROUND OF THE INVENTION

The current inventors previously patented a device and method for automatically applying collars (U.S. Pat. No. 5,881,672 to Pound et al.), which is hereby incorporated by reference. The invention described herein relates to a device and method for removing automatically-attaching collars—such as those described in the inventor's previous patent.

Many diseases are transmissible to man and animals by ectoparasites such as ticks. Because some wildlife species (for example white-tailed deer) are capable of propagating and harboring large populations of these ectoparasites, an effective strategy for the prevention of disease transmission should include the treatment of wildlife that inhabit the treatment area. However, the treatment of significant numbers of wild animals presents multiple challenges.

In targeted tick eradication areas, the ability to control ticks on wildlife can be a critical factor to the success of an eradication program. For example, cattle ticks were eradicated from the United States in the 1950's, and a quarantine Zone was established along the Texas-Mexico border between Del Rio and Brownsville, Tex. to prevent re-infestation of US cattle herds. Yearly outbreaks of ticks that occur in the quarantine zone are controlled by treating the cattle and by vacating infested pastures. However, the cattle frequently intermingle with grazing (for example) deer so that the cattle are frequently re-infected by the ticks infecting the deer. Any successful cattle tick eradication program must also address the ticks that infect the deer.

One means of addressing the tick problem is the application of a pesticide-impregnated collar. Such collars may be applied by the apparatus described in the inventor's previous patent (cited and incorporated by reference above). However, there is currently no reliable means for removing the collars once the pesticide in the collar is exhausted—other than trapping and/or tranquilizing the target animals.

The need exists for an automated means of effectively and efficiently removing a collar from wildlife or domestic animals. The current invention utilizes an automated means for quickly and efficiently removing a collar (such as the type of collar applied by an automated machine) from a targeted animal without trapping or tranquilizing the animal.

SUMMARY OF THE INVENTION

This disclosure is directed to an automatically-detachable collar pendant system. The collar pendant system comprises a flexible collar. One end of the collar is attached to a front pendant segment and the second end of the collar is attached to an intermediate segment. In the assembled configuration, the intermediate segment is sandwiched between the front segment and a rear segment (which is also attached to the front segment). A pendant attachment/detachment assembly connects (at least) the front and intermediate segments so that the front segment is fastened to the intermediate segment. In operation, the pendant system is structured so that when the pendant detachment assembly receives an automated signal, the front segment detaches from the intermediate segment and the pendant system is able to fall off of the target animal.

DETAILED DESCRIPTION OF PREFERRED EMBODIMENTS

Figure 1:
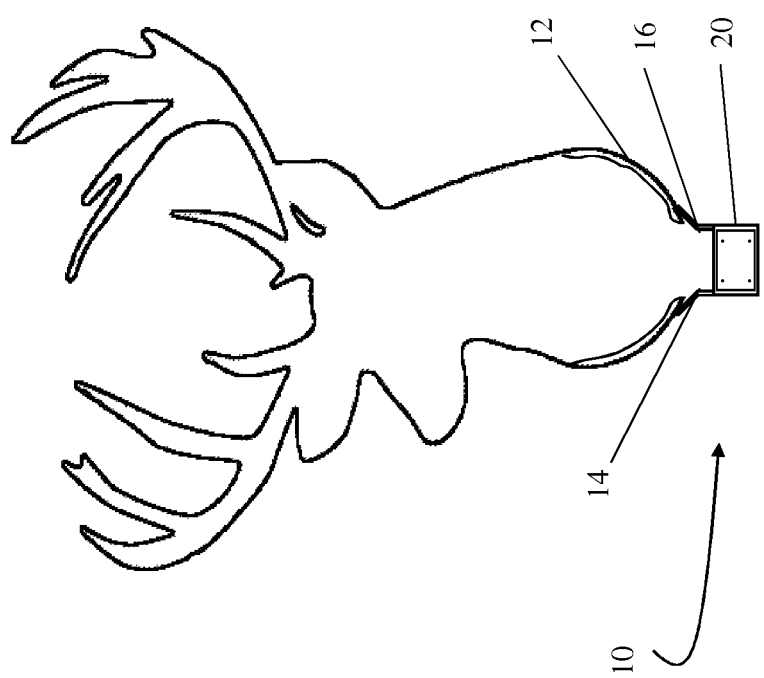
FIG. 1 is a front view of the collar and pendant assembly as described herein—as the collar would be worn by a deer.

As generally shown in FIG. 1, the method and apparatus described herein comprises a pendant assembly 10 attached to a collar 12. The pendant assembly 10 generally comprises a first attachment arm 14, a second attachment arm 16, and a pendant body 20. The first and second attachment arms 14, 16 are attached to the flexible collar 12.

Figure 2:
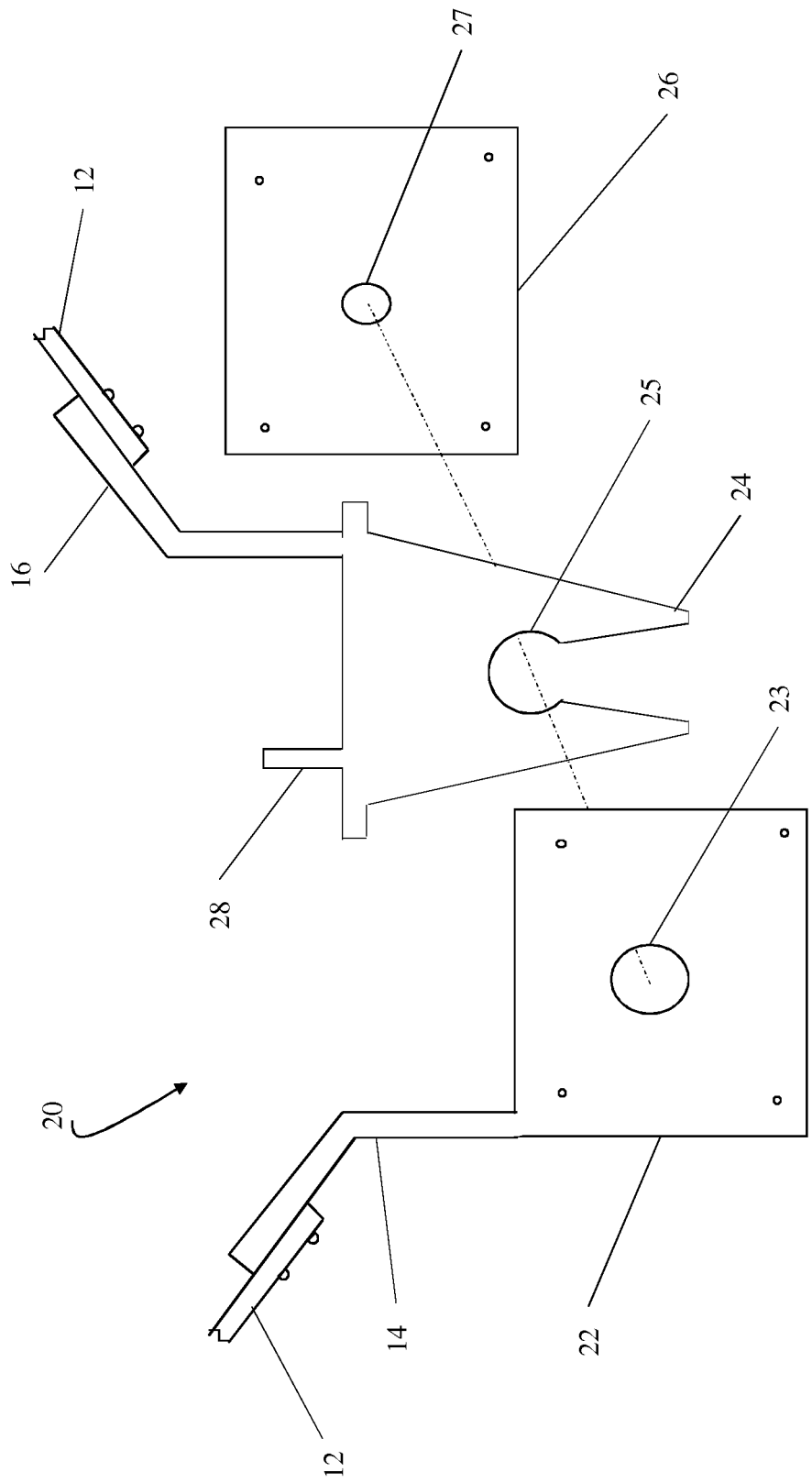
FIG. 2 is an exploded view of the front, intermediate and rear segments of the pendant.

As best shown in FIG. 2, the pendant body 20 generally comprises a front segment 22, an intermediate segment 24, and a rear segment 26. The first attachment arm 14 is integral with the front segment 22, and the second attachment arm 16 is integral with the intermediate segment 24. An exemplary arm 28 is shown in FIG. 2 as an example of an attachment appendage that may be used as an attachment surface for additional sensors or other hardware. For example, a radio transmitter (or similar device) may be attached between arm 28 and arm 16.

In alternative embodiments, the first attachment arm 14 may attach to the intermediate segment 24 and the second attachment arm 16 may attach to the front or rear segments. Any configuration should be considered within the scope of the invention so long as the first end of the collar 12 attaches to a pendant segment that is not otherwise attached to the second end of the collar.

As best shown in FIG. 2, the front segment 22 has a front aperture 23 that is the same general diameter as an intermediate aperture 25 in the intermediate segment 24. However, unlike the front aperture 23, the intermediate aperture 25 has a keyhole-shape. The rear segment 26 has a rear aperture 27 that has a significantly smaller diameter than the front 23 and intermediate 25 segments.

Figure 3:
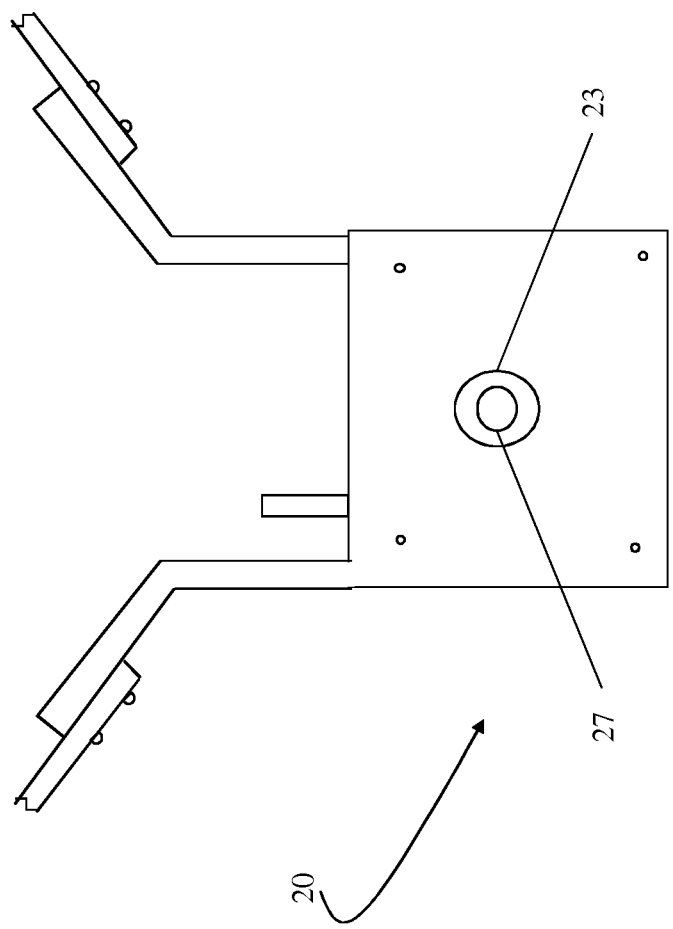
FIG. 3 is a front view of the three primary pieces shown in FIG. 2 in the assembled configuration.

FIG. 3 shows the three segments 22, 24, 26 of the body of the pendant 20 in a non-exploded, assembled configuration. In FIG. 3 the smaller rear aperture 27 is visible through the larger front aperture 23. The intermediate aperture 25 is aligned with the front aperture 23 and consequently is not visible in FIG. 3. In the preferred embodiment, the pendant body 20 and the attachment arms 14, 16 are comprised of molded plastic, but other materials should be considered within the scope of the invention. Similarly, in the preferred embodiment, the collar 12 is comprised of a pesticide-impregnated plastic.

Figure 4:
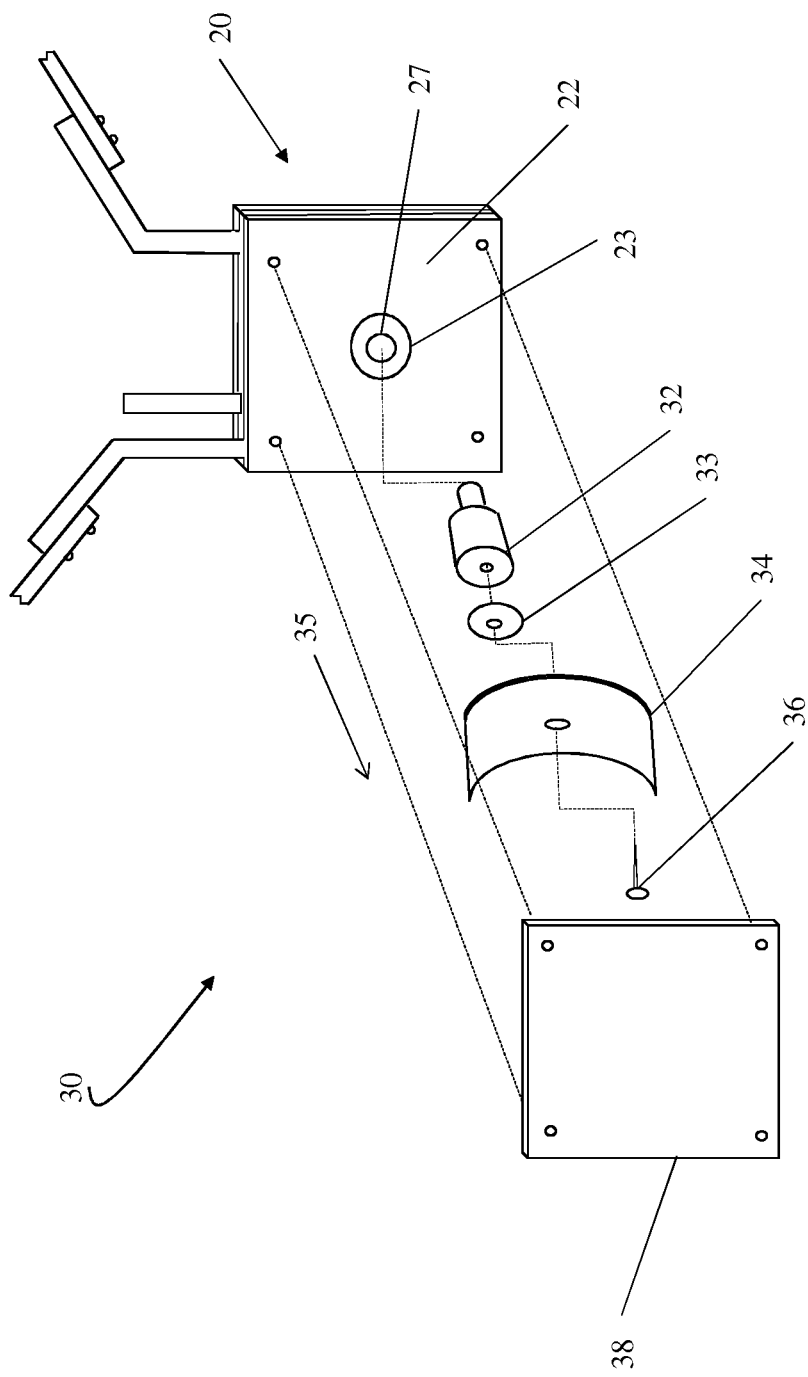
FIG. 4 is an exploded view of the pendant system detachment assembly.

FIG. 4 generally shows the pendant detachment assembly 30. The detachment assembly 30 comprises a dual-diameter retention pin 32. The large diameter portion of the pin 32 is attached to the convex side of a curved spring-steel substrate 34 by a screw 36 or the like. The curved steel substrate comprises a retention spring 34. A steel disk 33 separates the retention spring 34 from the dual diameter pin 32. The large diameter portion of the pin 32 extends through the front and intermediate apertures 23, 25, and the small diameter portion of the pin 32 extends into the rear aperture 27 (see FIGS. 2 and 3).

When the large diameter portion of the dual diameter pin 32 extends through the front and intermediate sections, then the collar pendant system 10 is "fastened" so that both ends of the collar 12 are joined in the pendant body 20. For the purposes of this disclosure, the term "fastened" means that the front segment 22 is joined adjacent to (at least) the intermediate segment 24, so that the front and intermediate segments cannot be separated under normal operating conditions without the use of a tool or a separation mechanism. In operation, the front 22 and intermediate 24 (and rear 26) segments are fastened together so that the collar 12 is secured around the neck of an animal.

Figure 5:
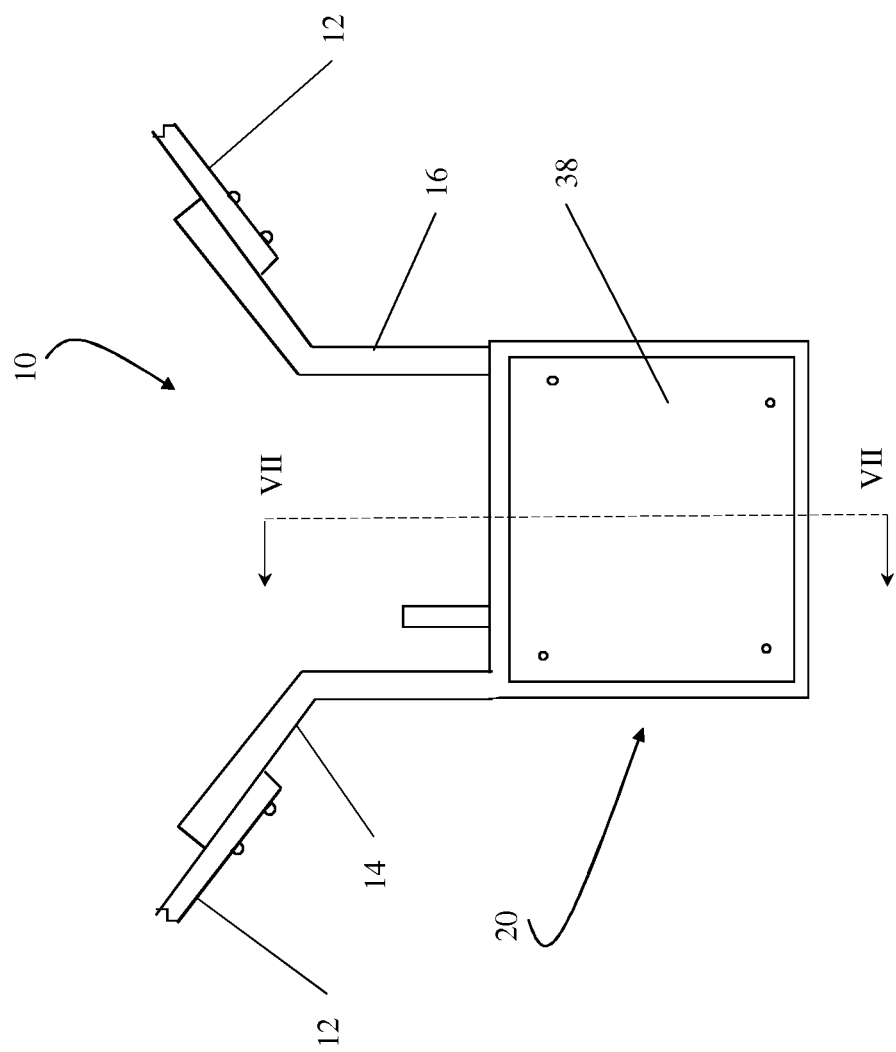
FIG. 5 is a front view of the pendant fully assembled, including the section line VII.

As shown in FIG. 4, a steel retention plate 38 holds the retention spring 34 in place on the face of the front segment 22 of the pendant body 20. In the installed configuration, the retention spring 34 retains its concave shape. As best shown in FIG. 4, screws that hold the retention plate 38 in place also extend through the front 22 and rear 26 segments, but not through the intermediate segment 24. (Note that for clarity, in FIG. 4, the dashed line representing attaching the lower left retention plate 38 screw is omitted). FIG. 5 shows the pendant assembly 10 in the fully assembled configuration.

The detachment assembly 30 is designed to be activated by an electromagnet of sufficient power to flatten the retention spring 34, and thereby enable the intermediate segment 24 to separate from the front segment 22 and the rest of the collar body 20 so that the collar 12 falls off the target animal. Specifically, as best shown in FIG. 4, when a strong magnet is applied to the retention plate 38, the concave portion of the retention spring 34 compresses (i.e. flattens) against the backside of the retention plate 38. When the retention spring 34 is compressed, the dual diameter pin 32 is pulled in the direction of the arrow 35. Note that, for the purposes of this disclosure, a component receives a "magnetic signal" when the component comes within the influence of a magnetic field so that the component moves or is changed by the magnetic field.

When the retention pin 32 is pulled forward in the direction of the arrow 35 (as shown in FIG. 4), the small diameter portion of the pin 32 aligns with the vertical portion of the keyhole aperture 25 in the intermediate segment 24 (as shown in FIG. 2). When the small diameter portion of the pin 32 and the keyhole portion of the aperture 25 align, the small diameter portion of the pin 32 can slip past the shoulders of the aperture 25 and out of the vertical portion of the keyhole aperture 25.

Essentially, when the small diameter portion of the pin 32 is aligned with the vertical portion of the keyhole aperture 25, movement of the animal and gravitational force causes the intermediate segment 24 to move upwardly relative to the body of the pendant 20 and thereby separate (i.e. unfasten) from the body of the pendant 20—so that the collar 12 falls off the target animal. To aid in the "unfastening" process, in the preferred embodiment, coil-type compression springs (not shown) may be employed which would apply a continuous upward force on the intermediate segment 24 so that when the large-diameter portion of the pin 32 moves out of the intermediate aperture 25 (in the direction of the arrow 35), the springs push intermediate segment 24 upwardly and thereby unfasten the intermediate segment 24 from the rest of the body of the pendant 20.

Figure 6:
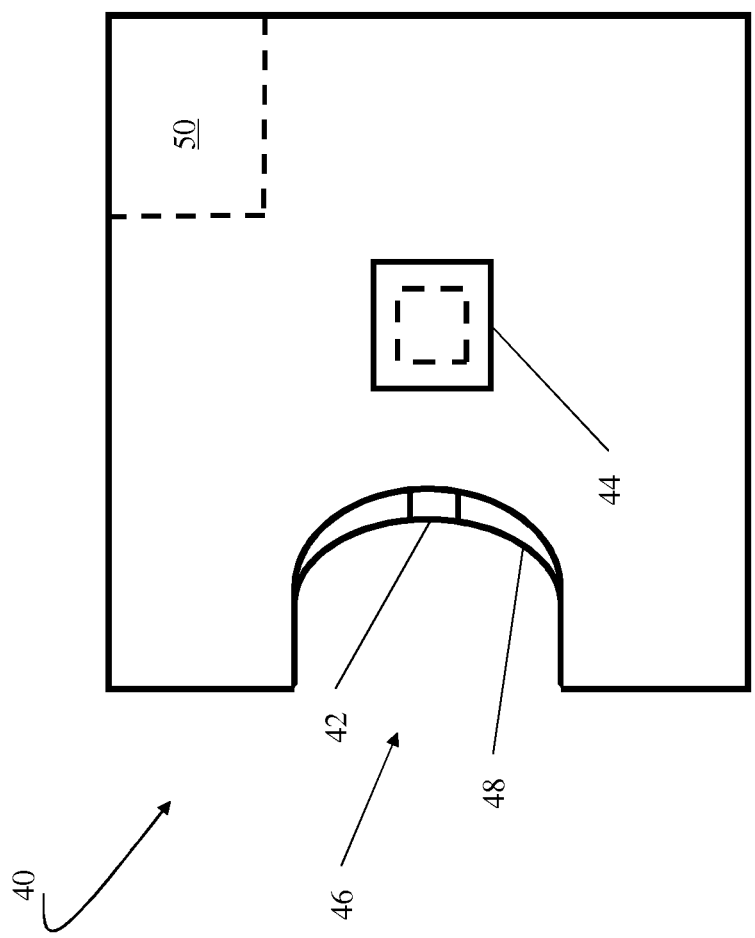
FIG. 6 is a top view of the bait station, including the electromagnetic detachment mechanism.

The detachment assembly 30 is specifically designed to be activated by a pendant release mechanism 42. In the preferred embodiment, the pendent release mechanism 42 comprises an electromagnet that is built into a bait station 40, as generally shown in FIG. 6. In the preferred embodiment, a deer (or other wild or domestic animal) is attracted to a bait (such as food) in a bait receptacle 44. The animal enters the inlet portion 46 of the bait station 40. As the animal extends its head to reach the bait receptacle 44, it interacts with an electrical and/or mechanical sensor 48. A controller 50 is alerted to the animal's presence and the animal is (optionally) identified by the controller based on an RFID tag implanted in the animal or attached to the animal's collar. If an operator intends to remove the animal's collar 12 and pendant assembly 10, the electromagnet is activated, thereby activating the detachment assembly 30 and causing the pendant system 10 and attached collar 12 to fall off.

As best shown in FIGS. 2-5, in operation, the body of the pendant 20 comprising front 22, intermediate 24, and back 26 segments is assembled as shown in FIGS. 2 and 3. As shown in FIG. 4, a concave retention spring 34 holds a dual diameter pin 32 in position so that a large-diameter portion of the pin 32 extends through apertures 23, 25 in the front 22 and intermediate 24 segments, and a small-diameter portion of the pin 32 extends through an aperture 27 in the rear segment 26 of the pendant body 20.

As best shown in FIG. 6, when an operator wants to remove a collar 12 and pendant system 10 from a target animal, the target animal is drawn to a specially equipped bait station 40. When a controller 50 senses an animal in position at the bait station 40, the controller 50 activates an electromagnet 42 in the bait station 40. As best shown in FIG. 4, when the electromagnet 42 contacts the retention plate 38, the retention spring 34 flattens against the backside of the retention plate 38. The flattening of the retention spring 34 causes the pin 32 to move in the direction of the arrow 35 so that the small diameter portion of the pin 32 aligns with the vertical portion of the keyhole aperture 25 in the intermediate segment 24. When the small diameter portion of the pin 32 aligns with the keyhole aperture 25, the intermediate segment 24 is free to move upwardly and effectively separate from the rest of the body of the pendant 20 so that the pendant assembly 10 and the collar 12 falls away.

Figure 7:
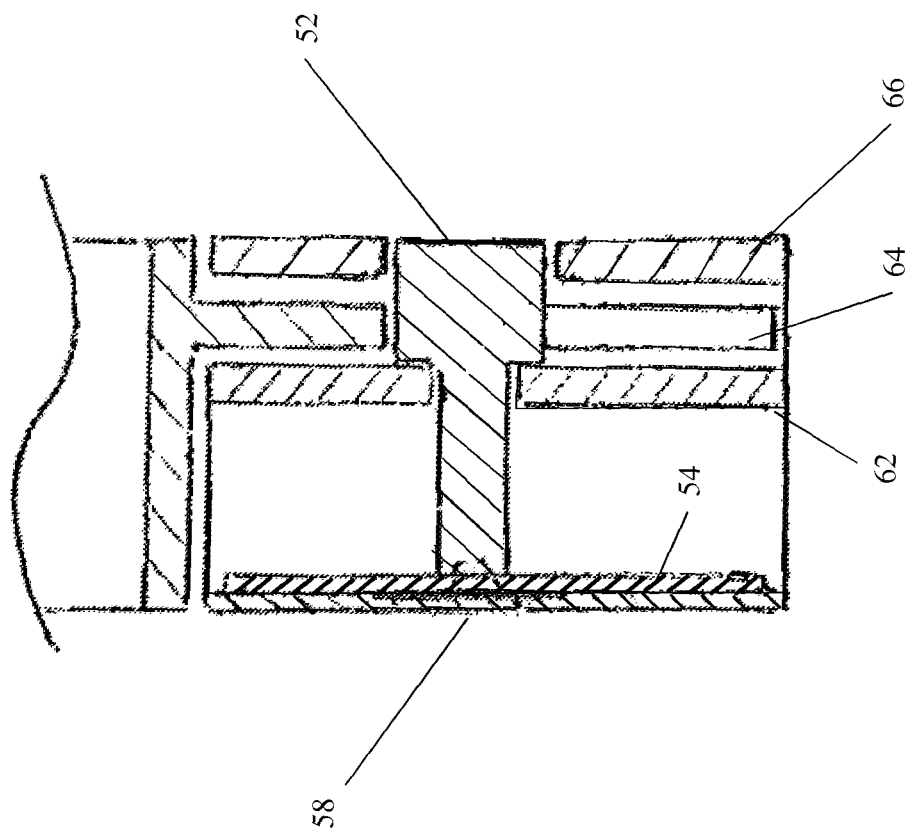
FIG. 7 is a sectional view of an alternative embodiment of the pendant when the pendant is in the fastened position—along the section line VII shown in FIG. 5.
Figure 8:
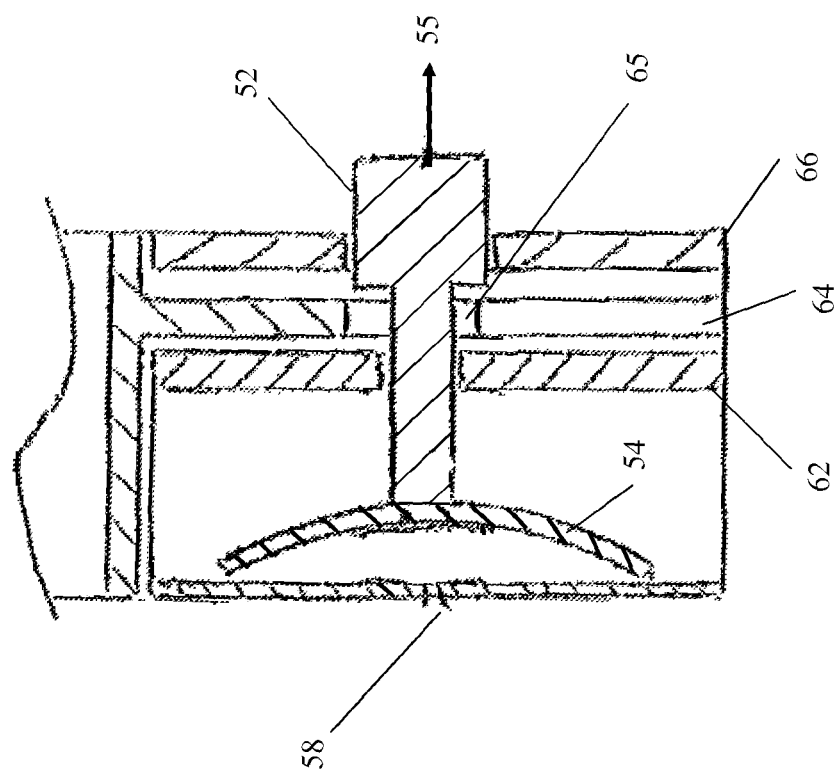
FIG. 8 is a sectional view of the pendant of FIG. 7 in the unfastened position.

FIGS. 7 and 8 are sectional views (with reference to the section line VII in FIG. 5) of an alternative embodiment of the pendant body 20 which comprises an alternative pendant detachment assembly. As shown in FIG. 7, in the alternative embodiment, the retention spring 54 is flattened against the back side of the retention plate 58. The retention spring 54 is held against the backside of the retention plate by a heat-sensitive adhesive or other heat sensitive medium. A dual diameter pin 52 (as with the preferred embodiment) extends from the retention spring 54 through the front 62, intermediate 64 and rear 66 pendant segments. In the alternative embodiment, the pendent segments 62, 64, 66 have a similar general configuration as the preferred embodiment pendent segments 22, 24, 26 (see FIG. 2), with the intermediate segment 64 having a keyhole shaped aperture 65 (see intermediate segment 24 and aperture 25 in FIG. 2).

In operation, in the alternative embodiment, when an animal is in position at the bait station 40 described above (see FIG. 6), the pendant 20 contacts the pendant release mechanism 42. In the alternative embodiment, the pendent release mechanism 42 comprises a heat induction tool that transmits heat through the pendant's retention plate 58 and softens and/or melts or otherwise releases the adhesive material that connects the retention plate 58 to the retention spring 54 so that the retention spring 54 is released from the retention plate 58. As shown in FIGS. 7 and 8, when the retention spring 54 is released from the retention plate 58, the dual diameter pin 52 moves in the direction of the arrow 55 (FIG. 8) so that a small diameter portion of the dual diameter pin 52 aligns with the keyhole-shaped aperture 65 of the intermediate segment 64.

As with the preferred embodiment, when the small diameter portion of the pin 52 aligns with the keyhole aperture 65, the intermediate segment 64 is free to move upwardly and effectively separate from the rest of the body of the pendant 20 so that the pendant assembly 10 and the collar 12 falls away.

For the foregoing reasons, it is clear that the method and apparatus described herein provides an innovative collar removal system. The current system may be modified in multiple ways and applied in various technological applications. The disclosed method and apparatus may be modified and customized as required by a specific operation or application, and the individual components may be modified and defined, as required, to achieve the desired result.

Although the materials of construction are only generally described, they may include a variety of alternate compositions consistent with the function described herein. Such variations are not to be regarded as a departure from the spirit and scope of this disclosure, and all such modifications as would be obvious to one skilled in the art are intended to be included within the scope of the following claims.

What is claimed is:

1. An automatically detachable collar pendant system for a target animal, the system comprising:
    a flexible collar having first and second ends;
    a front pendant segment attached to the first end of the collar;
    a rear pendant segment attached to the second end of the collar;
    an intermediate pendant segment attached to the second end of the collar, wherein the intermediate pendant segment is sandwiched between the front and rear pendant segments;
    a pendant detachment assembly comprises a connecting member, a curved spring-steel substrate and a retention plate, wherein the retention plate holds the curved spring-steel substrate in place on the face of the front pendant segment, the pendant detachment assembly further connecting the front and intermediate pendant segments so that the front segment and intermediate segments are fastened together; and
    wherein the pendant system is structured so that when the pendant detachment assembly receives a magnetic signal, the magnetic signal causes the curved spring-steel substrate to flatten so that the connecting member extending through the front, intermediate, and rear pendant segments changes positions to allow the intermediate pendant segment to detach from the front pendant segment thereby enabling the pendant assembly to fall off of the target animal.

2. The system of claim 1 wherein the connecting member extends through the front segment and at least into the intermediate segment.

3. The system of claim 1 wherein the connecting member extends through the front segment and through the intermediate segment and at least into the rear segment.

4. The system of claim 3 wherein the connecting member comprises a pin.

5. The system of claim 1 wherein the signal comprises an induction heat signal.

6. The system of claim 1 further comprising the rear pendant segment attached to the front pendant segment, the connecting member aligning with a keyhole aperture in the intermediate pendant segment.

7. The system of claim 6 wherein the connecting member comprises a dual diameter pin so that when a small diameter portion of the dual diameter pin is aligned with the keyhole aperture, the intermediate pendant segment is able to move upwardly and unfasten with front and rear pendant segments, thereby enabling the collar pendant system to fall off of the target animal.

8. The system of claim 1 wherein the signal emanates from a bait stand.

9. The system of claim 1 wherein the flexible collar comprises a plastic collar.

10. The system of claim 1 wherein the flexible collar comprises a collar impregnated with pesticide.

* * * * *